(12) United States Patent
Patton

(10) Patent No.: US 10,627,424 B2
(45) Date of Patent: Apr. 21, 2020

(54) CRYOGENIC COOLING SYSTEM

(71) Applicant: OXFORD INSTRUMENTS NANOTECHNOLOGY TOOLS LIMITED, Abingdon Oxon (GB)

(72) Inventor: Mark Patton, Abingdon Oxon (GB)

(73) Assignee: OXFORD INSTRUMENTS NANOTECHNOLOGY TOOLS LIMITED, Abingdon Oxon (GB)

( * ) Notice: Subject to any disclaimer, the term of this patent is extended or adjusted under 35 U.S.C. 154(b) by 0 days.

(21) Appl. No.: 16/304,906

(22) PCT Filed: May 26, 2017

(86) PCT No.: PCT/GB2017/051503
§ 371 (c)(1),
(2) Date: Nov. 27, 2018

(87) PCT Pub. No.: WO2017/203278
PCT Pub. Date: Nov. 30, 2017

(65) Prior Publication Data
US 2019/0310283 A1    Oct. 10, 2019

(30) Foreign Application Priority Data

May 27, 2016 (GB) .................................. 1609395.7

(51) Int. Cl.
*F25B 9/00* (2006.01)
*G01N 21/00* (2006.01)
(Continued)

(52) U.S. Cl.
CPC ................ *G01Q 30/10* (2013.01); *B01L 7/50* (2013.01); *F25D 19/006* (2013.01); *G01N 1/42* (2013.01);
(Continued)

(58) Field of Classification Search
CPC .......... G01Q 30/10; G01Q 20/02; B01L 7/50; B01L 2200/025; B01L 2200/026;
(Continued)

(56) References Cited

U.S. PATENT DOCUMENTS 3,600,581 A * 8/1971 Menke .................... G01J 5/061
250/330
4,549,065 A * 10/1985 Camacho ................. H05H 1/28
219/121.37
(Continued)

FOREIGN PATENT DOCUMENTS

| GB | 2485670 | 5/2012 |
| GB | 2504187 | 1/2014 |
| GB | 2551356 | 12/2017 |

OTHER PUBLICATIONS

Hart, S., European Search Report issued for Patent Application No. GB1810020.6, dated Nov. 6, 2018, 3 pages.

*Primary Examiner* — Nicole M Ippolito
(74) *Attorney, Agent, or Firm* — King & Spalding LLP

(57) ABSTRACT

A cryogenic cooling system can include a cooling device and a sample holder. The system can also include a first optical member having a first aperture and a first collimator, where the first collimator is positioned to collimate the light. The system can further include a second optical member having a second aperture and a second collimator where the second collimator is positioned to collimate the light, the first optical member being mounted to the cooling device and the second optical member being mounted to the sample holder. When the sample holder is mounted to the cooling device, a relative position of the first optical member and the second optical member allows the light to pass between the first and second apertures via the first collimator and second
(Continued)

collimator separated by a physical gap to allow optical communication between the first optical member and the second optical member.

12 Claims, 3 Drawing Sheets

(51) Int. Cl.
  *G01N 1/42* (2006.01)
  *G01Q 30/10* (2010.01)
  *B01L 7/00* (2006.01)
  *F25D 19/00* (2006.01)
  *G01N 21/01* (2006.01)
  *G02B 27/30* (2006.01)
  *G02B 6/32* (2006.01)
  *G01Q 20/02* (2010.01)

(52) U.S. Cl.
  CPC ............ *G01N 21/01* (2013.01); *G01Q 20/02* (2013.01); *G02B 6/32* (2013.01); *G02B 27/30* (2013.01); *B01L 2200/025* (2013.01); *B01L 2200/026* (2013.01)

(58) Field of Classification Search
  CPC ........ F25D 19/006; G01N 1/42; G01N 21/01; G02B 6/32; G02B 27/30
  USPC ............ 250/440.11, 441.11, 442.11, 443.1; 850/13
  See application file for complete search history.

(56) References Cited

U.S. PATENT DOCUMENTS

| | | | | |
|---|---|---|---|---|
| 5,859,893 | A | * | 1/1999 | Moorman ................ A61B 6/06 378/145 |
| 2007/0175870 | A1 | * | 8/2007 | Hanus ..................... H05H 1/34 219/121.5 |
| 2009/0028294 | A1 | * | 1/2009 | Harding ........... G01N 23/20083 378/90 |
| 2015/0354054 | A1 | * | 12/2015 | Fruchterman ....... H01J 7/32522 204/298.06 |
| 2017/0245391 | A1 | * | 8/2017 | Bencivenga ....... H05K 7/20145 |

* cited by examiner

CRYOGENIC COOLING SYSTEM

CROSS-REFERENCE TO RELATED APPLICATIONS

This application is a PCT national phase filing under 35 U.S.C. 371 and claims priority to international patent application PCT/GB2017/051503, filed Jun. 26, 2017, which itself claims priority to British patent application number GB1609395.7, filed May 27, 2016, both of which are entitled, "Cryogenic Cooling System." The entire texts of the above-referenced disclosures are specifically incorporated herein by reference without disclaimer.

FIELD OF THE INVENTION

The present invention relates to cryogenic cooling systems, in particular to optical connections in cryogenic cooling systems.

BACKGROUND OF THE INVENTION

Cryogenic cooling systems are often required to cool a sample. This allows the sample to be analysed using one or more forms of microscopy, such as Atomic Force Microscopy (AFM) or Scanning Probe Microscopy (SPM), by reducing atomic vibrations in the sample. This is achieved by use of a cooling device, such as a dilution refrigerator to cool a sample to a desired temperature and to maintain that temperature during the analysis or to slow any increase in temperature.

To avoid the need for the sample to be held within the cooling device and thereby requiring the sample to be placed within the cooling device while at ambient temperature, a sample is able to be held within a sample holder. Such sample holders, also known as "sample pucks", are removably mountable to the cooling device. This allows the environment into which the sample holder containing the sample is to be placed, to be cooled before the sample holder is introduced into that environment and the sample holder to be exchanged while the system is cold.

Since direct analysis of a sample is usually required, the analysis equipment needs to be held within the sample holder as well as the sample. This means that everything required by the equipment during the analysis has to either be held within the sample holder or to be supplied from outside the sample holder during the analysis. For example, it is known to supply power to the equipment within the sample holder via cables.

To allow a sample holder to be removable, there are connectors on the sample holder that mate with connectors on the cooling device. This allows power, for example, to be provided to connectors on the cooling device that mate with corresponding connectors on the sample holder so as to power the analysis equipment on the sample holder.

While providing power and other electrical connections between a cooling device and sample holder is relatively straightforward, the ability to provide a connection that allows light to pass between the cooling device and sample holder is significantly more difficult. A suitable optical connection cannot easily be established since the removable nature of the sample holder needs to be maintained whilst also preventing attenuation of light.

When light needs to pass between the cooling device and sample, such as when an optical signal is produced by the analysis or light is needed to stimulate a response in the sample, optical fibres (also referred to herein as "fibres") are commonly used. However, commercially available connectors for optical fibres are screw-fit connectors, which are incompatible with removably mountable sample holders. This is because there is no suitable access for connecting a screw-fit connector to a sample holder, especially if any increase in temperature is to be kept to a minimum when the sample holder is mounted to the cooling device.

The alternative to a screw-fit connector would be a push-fit connector. This is still unsuitable however, because for light to pass between the cooling device and sample holder, the fibres on each of cooling device and the sample holder have to be positioned such that the light is not attenuated when passing between the fibres. This is only achievable if the ends of the fibres through which light is transmitted in use are very close together, to maintain the signal strength, and ensure precise alignment with each other to avoid light emitted from one fibre not passing into the opposing fibre.

Due to temperature cycling, such connections are difficult to produce because the changes in temperature will affect the alignment and positioning of the fibre ends. This would make any such push-fit optical connection unreliable and cause the connection to deteriorate with use. Accordingly, a reliable optical connector is required that is able to withstand temperature cycling and repeated use so as to allow light to be passed between a cooling device and a sample holder.

SUMMARY OF INVENTION

According to a first aspect of the invention, there is provided a cryogenic cooling system for providing optical communication with a sample holder, the cryogenic cooling system comprising: a cooling device and a sample holder, wherein the sample holder is removably mountable to the cooling device; a first optical member comprising a first aperture and a first collimator, light being able to pass through the first aperture, wherein the first collimator is positioned to collimate the light when emitted from the first aperture; a second optical member comprising a second aperture and a second collimator, light being able to pass through the second aperture, wherein the second collimator is positioned to collimate the light when emitted from the second aperture, the first optical member being mounted to the cooling device and the second optical member being mounted to the sample holder, wherein when the sample holder is mounted to the cooling device, the relative positions of the first optical member and the second optical member are such that light is able to pass between the first and second apertures via the first collimator and the second collimator, there being a physical gap between the first collimator and the second collimator thereby enabling optical communication between the first optical member and the second optical member.

Generally speaking, this provides a fibre alignment and proximity independent optical connection between a cooling device and sample holder. This is because the configuration of the optical members allows the alignment and proximity requirements to be less restrictive. Instead of the alignment and proximity requirements of the optical connection being determined by the precise positioning of ends of opposing optical fibres, said requirements are only restricted by mechanical constraints and tolerances of the physical connection between the cooling device and sample holder. This is beneficial because it allows a sample holder requiring an optical connection to be mounted to a cooling device at its base operational temperature instead of mounted at room temperature before the cooling is applied. The optical connection will also be reliable, will withstand repeated use and simplifies the connections required between the sample holder, cooling device and the various components connected to each.

Additionally, the two collimators provide a capability of light transmission from the cooling device to the sample holder and from the sample holder to the cooling device, i.e. two-way light transmission. This is beneficial as it allows light to pass to the sample as well as light to be emitted from the sample or analysis equipment and passed out of the sample holder to be recorded and/or analysed It is noted that the term "aperture" is intended to refer to an optical aperture. Such an aperture allows optical transmission therethrough, i.e. the aperture is an aperture suitable for optical transmission. This is achieved by the aperture providing an optically transparent region through which light is able to pass. This can be in the form of an opening in an object. However, it is more commonly provided by at least part of a boundary of a medium through which light is able to pass, or the medium itself.

The light passing through the cryogenic cooling system may be for illumination or data transmission purposes. These purposes can be fulfilled by optical data signals (for example provided by a laser), or by a continuous or pulsed stream of light. Using an optical data signal allows information to be transmitted between the cooling device and the sample holder, and a stream of light allows light either to be analysed or to be used as part of analysis being carried out on a sample for example. Additionally, as well as the visible light, the term "light" is intended to include Ultra Violet (UV) light and Infrared (IR) light.

The system is intended to be operated at cryogenic temperatures, such as at 70 Kelvin or lower, but can be operated at temperatures above this. Typically however, the system is configured to cool a sample in the sample holder to a temperature of about 10 Kelvin (K) or below. This allows the system to be used for quantum dot and quantum computing purposes.

Preferably, the system is configured to cool a sample in the sample holder to a temperature of about 4K or below. This allows the cooling device to be a cryostat with a helium chamber simplifying the workings of the cooling device.

Also preferably, the system is configured to cool a sample in the sample holder to a temperature of about 50 milliKelvin (mK) or below. This allows precise atomic microscopy to be conducted on a sample held within the sample holder. The cooling device may be able to cool to lower temperatures than this. Typically, the cooling device is configured to cool to a temperature of about 10 mK or lower.

The second collimator may only collimate light, though typically, the second collimator is configured to focus light towards the second aperture that is received from a distal side of the second collimator with respect to the second aperture. This provides improved signal strength of light being transmitted from the first aperture to the second aperture improving the signal-to-noise ratio of light received at the second aperture and reducing the likelihood of signal loss. Additionally, should there be a misalignment of the collimator in each optical member, the second collimator will focus any light it receives towards the second aperture thereby maintaining the optical connection even though there is a misalignment.

As with the second collimator, the first collimator may only collimate light, but typically, the first collimator is configured to focus light towards the first aperture that is received from a distal side of the first collimator with respect to the first aperture. Similar to the ability of the second collimator to focus light, this provides improved signal strength of light being transmitted from the second aperture to the first aperture improving the signal-to-noise ratio of light received at the first aperture and reducing the likelihood of signal loss. As with the second collimator, this also provides a capability to mitigate misalignment of the optical members so that any light received by the first collimator is focused towards the first aperture maintaining the optical connection when there is such a misalignment.

Each collimator may be a waveguide or any element that is capable of collimating light. Typically, the first collimator and/or the second collimator is a lens. This is beneficial because, for each collimator that is a lens, the thickness of the collimator parallel to the direction along which the light is collimated can be kept to a minimum. This reduces the amount of space required for the respective optical member. Additionally, this allows a simple component that achieves the desired collimation to be used thereby simplifying the construction of the system.

Each lens can be a standard symmetric lens, also known as a "simple" lens. However typically, each lens is an aspheric lens. This reduces spherical and optical aberrations, such as astigmatism, compared with a simple lens. Additionally, this allows a single lens to be used for each collimator and reduces the space required for the lens(es).

Each aperture may be an open end of a waveguide or a light transceiver, source or receiver. Typically, one or each of the first aperture and the second aperture is an end of an optical fibre.

This provides a greater amount of flexibility in the transmission of light through the sample holder and/or the cooling device. This is because non-fibre waveguides or mirrors are more susceptible to vibrations, and are more difficult to accommodate relative to the other components of the cryogenic cooling system.

Each optical fibre may be connected to the respective optical member by any connector whether permanent or temporary. Typically, each optical fibre is connected to the respective optical member by a push-fit connector or a screw-fit connector. This provides a simple connection between each optical fibre and the respective optical member that is removable and therefore allows the fibre to be removed, easily reattached and/or replaced. Due to the other components of the optical members, the severity of the disadvantages of these connections is reduced since it is not normally necessary to separate those connections when removing the sample holder from the cooling device.

Any suitable cold source can be used for the cooling device, but typically, the cooling device is a dilution refrigerator, pre-cooled thermal mass or cryogen chamber to which the sample holder is able to be thermally coupled in use. These provide reliable cooling that can be applied over an extended period of time. A cryocooler, such as a Pulse Tube Refrigerator (PTR), would also be a suitable cooling device.

BRIEF DESCRIPTION OF FIGURES

Examples of a cryogenic cooling system are described in detail below, with reference to the accompanying figures, in which.

DETAILED DESCRIPTION

We now describe two examples of a cryogenic cooling system, along with a description of the relative positioning of the sample holder and cooling device when mounted. A brief description of the cryostat in which the cryogenic cooling system is located in use is also provided.

Figure 1:
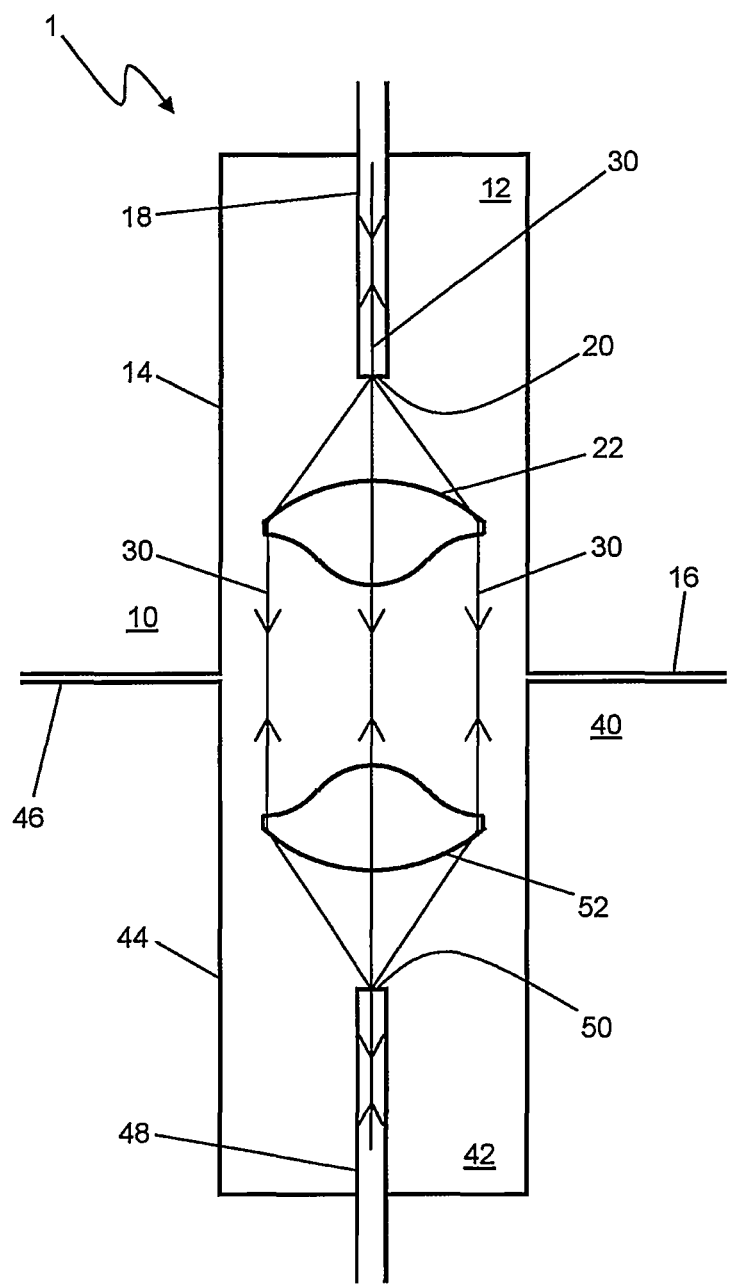
FIG. 1 shows a cross-section of a first example optical connection between a cooling device and a sample holder.

Referring now to FIG. 1, a first example cryogenic cooling system is illustrated generally at 1. The system has a cooling device 10 to which a sample holder 40 is removably mounted.

Figure 3:
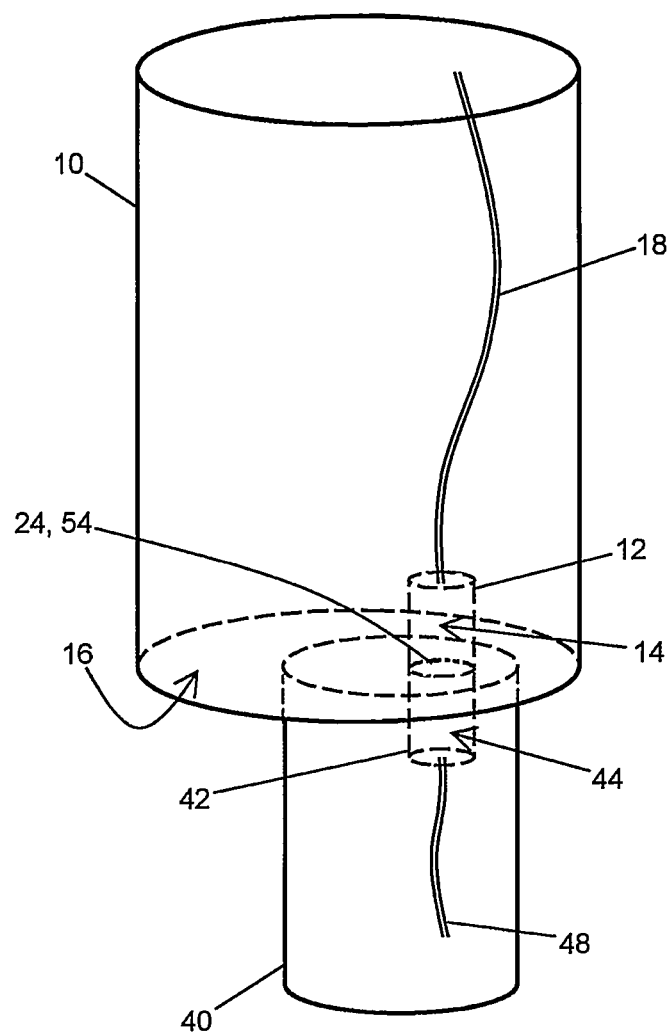
FIG. 3 shows a schematic of the cooling device and sample holder of FIG. 2 with the sample holder mounted to the cooling device.

The cooling device 10 has a first optical member 12 and the sample holder has a second optical member 42. Each optical member is defined by respective bores 14, 44, each of which is a blind-bore, in an end 16 of the cooling device and in a surface 46 of the sample holder that abuts the end of the cooling device when mounted to the cooling device. As is also shown in FIG. 3, when the sample holder is mounted to the cooling device the bore of the sample holder lines up with the bore of the cooling device so that there is an approximate alignment of the optical members.

Within the cavity formed by the bore 14 of the first optical member 12, there is an end portion of an optical fibre 18. The optical fibre tip 20 (also referred to as the "end of the optical fibre" or "fibre end") provides an aperture through which light is able to be transmitted. In this example system, the fibre tip providing the aperture is generally flat. In an alternative example, the fibre tip can be domed. A domed fibre tip reduces reflections but would limit the bandwidth over which the system could operate. Should a domed fibre tip be used, the lens effect of the fibre tip would need to be carefully considered in conjunction with other optical features of the system.

The fibre 18 is secured to the first optical member by a screw-fit connector (not shown) that is connected during the setup of the cooling device. This can be connected in preparation for analysis of a particular sample or can instead be connected during initial setup of the cooling device before operation or delivery.

The first optical member 12 also has a collimator. The collimator is an aspheric lens 22, which, in the example shown in FIG. 1, has a diameter of up to about 10 millimetres (mm). Usually this is a diameter of about 6 mm to about 7 mm.

The aspheric lens 22 is positioned such that light transmitted from the fibre tip 20 is intercepted and is configured to collimate any light received from the fibre tip. As shown by the light rays 30 in FIG. 1, light transmitted from the fibre tip diverges. This light is intercepted by the lens and is collimated.

This process also works in reverse because the lens 22 is configured to focus light received from the opposite side of the lens to the fibre tip 20. Accordingly, any collimated light received by the lens from the opposite side of the lens to the fibre tip (also referred to as the "distal side of the lens" from the fibre) is focused towards the fibre tip. The light then passes into the fibre and is transmitted away from the tip. This ability for bi-directional travel of the light is indicated by the arrows shown on the light rays 30 in FIG. 1.

The fibre tip 20 and the lens 22 are positioned so that they are approximately aligned along a common axis (not shown). The alignment does not need to be exact because the separation of the lens and the fibre tip provides sufficient tolerance for the alignment to be approximate instead of exact. As long as light emitted from the fibre tip is interceptable by the lens and light focused by the lens is interceptable by the fibre tip, the alignment is sufficient. This is achieved by having a separation between the fibre tip and the closest point of the lens to the fibre tip of about 4 mm to about 5 mm in this example. This separation is governed by the working distance and effective focal length (known as the "EFL") of the lens.

When in use, light emitted from the fibre tip is collimated into a beam. The collimated beam then passes into the second optical member 42 of the sample holder.

In the example shown in FIG. 1, the second optical member 42 of the sample holder 40 has the same relative optical arrangement as the first optical member 12 of the cooling device 10. As such, although the details of the second optical member are described in more detail below, any collimated beam of light that passes into the second optical member is incident on an aspheric lens in the second optical member. This lens focuses the collimated light beam towards a fibre tip, and any light incident on the fibre tip is able to pass into the sample holder via a fibre. This therefore provides an ability for optical transmission from the cooling device to the sample holder. Additionally, because the relative arrangements of the second optical member and the first optical member are the same in the example shown in FIG. 1, the process also functions the same way in reverse. Accordingly, an ability of optical transmission from the sample holder to the cooling device is provided.

In more detail, as shown in FIG. 1, the second optical member 42 has an optical fibre 48, an end portion of which is located in the cavity formed by the bore 44 of the second optical member. Again, the optical fibre has a tip 50 that provides an aperture through which light is able to be transmitted.

As with the optical fibre 18 of the first optical member 10, the fibre 48 of the second optical member 42 is secured to second optical member by a screw-fit connector (not shown). This is either connected during preparation of the sample holder 40 when it is required or is connected during production of the sample holder.

The second optical member 42 also has a collimator that is provided by an aspheric lens 52 in the example shown in FIG. 1. This is an identical lens to the aspheric lens 22 of the first optical member 12, so has the same diameter.

As with the first optical member 12, the aspheric lens 52 of the second optical member 42 is positioned such that light transmitted from the fibre tip 50 within the second optical member is intercepted and is configured to collimate any light received from the fibre tip. This is shown by the light rays 30 in FIG. 1 which are transmitted from the fibre tip 50 and diverge. The light is then intercepted by the lens and is collimated.

Again, this process also works in reverse because the lens 52 is configured to focus light received from the opposite side of the lens to the fibre tip 50. Accordingly, any collimated light received by the lens from the opposite side of the lens to the fibre tip (also referred to as the "distal side of the lens" from the fibre) is focused towards the fibre tip. This light passes into the fibre and is transmitted away from the tip. This therefore provides the same ability for bi-directional travel of the light as is possible in the first optical member 12 and is indicated by the arrows shown on the light rays 30 in FIG. 1.

Similarly to the fibre tip 20 and lens 22 of the first optical member 12, the fibre tip 50 and the lens 52 of the second optical member 42 are positioned so that they are approximately aligned along a common axis (not shown). The same approximate alignment is needed between the lens and the fibre tip of the second optical member for the same reasons given above for the approximate alignment of the fibre tip and lens of the first optical member.

As discussed above, as shown in FIG. 1, when the sample holder 40 is mounted to the cooling device 10, light is able to pass between the collimator 22 of the first optical member 12 and the collimator 52 of the second optical member 42. This allows light to be transmitted from the cooling device and the sample holder and from the sample holder to the cooling device. Accordingly, this enables two-way optical communication between the sample holder and the cooling device.

Due to the ability of each collimator 22, 52 to focus light incident upon it from the respective distal sides to the respective fibre tips 20, 40, the alignment between the two optical members 12, 42 can again be approximate. Only enough alignment is needed for the optical signal strength to be sufficient for the purpose for which the light is needed. This allows there to be an inexact overlap of the collimated light beam producible by each collimator while still allowing light to pass from one fibre to another.

Figure 2:
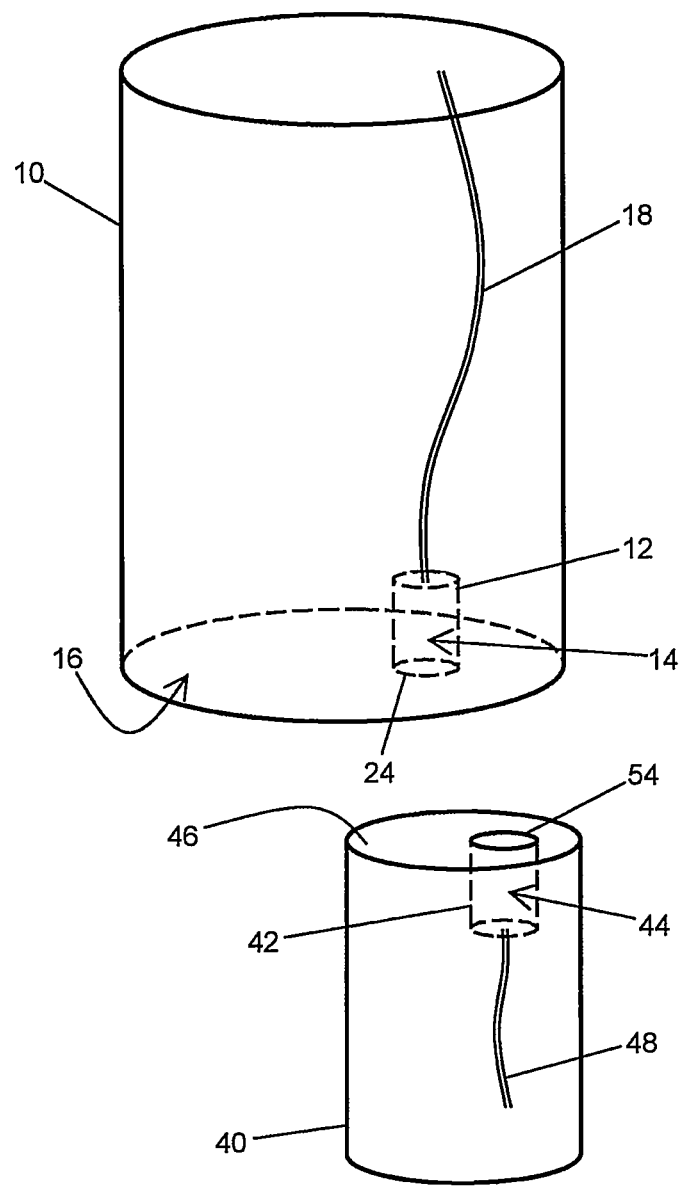
FIG. 2 shows a schematic of a cooling device and sample holder in an un-mounted configuration.

Referring now to FIGS. 2 and 3, these figures show the cooling device 10 and sample holder 40 in an un-mounted and a mounted configuration respectively. These figures show the cooling device and the sample holder of the first example.

Each of FIG. 2 and FIG. 3 show the first optical member 12 in the cooling device 10 and the second optical member 42 in the sample holder 40. As mentioned above, each optical member has a bore 14, 44. As can be seen in FIG. 2, each bore forms respective apertures 24, 54 in an end 16 of the cooling device and a surface 46 of the sample holder that abuts the end of the cooling device when mounted to the cooling device.

FIGS. 2 and 3 also show an optical fibre 18 connected to the first optical member 12 and an optical fibre 48 connected to the second optical member 42. The opposing end of each of these fibres is not shown. However, the optical fibre connected to the first optical member is connected to an external light source and/or to external processing equipment and the optical fibre connected to the second optical member is connected to the sample and/or the analysis equipment within the sample holder. Each external element is room temperature when the cryogenic cooling system is in use.

When the sample holder 40 is mounted to the cooling device 10, as shown in FIG. 3, the apertures 24, 54 provided the bore 14 of the first optical member 12 and the bore 44 of second optical member 42 are aligned. This allows light to pass between the cooling device and the sample holder as the optical elements (i.e. the optical fibre tips and collimators) are positioned so that light is able to pass between the optical elements of each optical member.

In use, when mounted to the cooling device 10, the sample holder 40 will be securely connected to the cooling device. There will also be other connections (not shown) provided by push-fit connectors to provide power and other electrical signals (such as control signals) to the sample holder and for signals to pass from the sample holder to the cooling device. Because of the connectors, only when all the connectors are aligned will the sample holder be able to be properly mounted to the cooling device. This avoids the possibility of the two optical members 12, 42 being misaligned. If no other connectors are provided, other forms of guide can be provided to avoid misalignment of the optical members.

Accordingly, the example provides a contactless optical connection between the cooling device and the sample holder. This allows light to be transmitted between these two components without precision alignment of fibres being necessary. This is because light is able to be transmitted from or through one component to the tip of the relevant fibre where it is emitted, diverges, and is collimated into a collimated beam by the local collimator. The collimated light is then focused by the collimator of the other component when present and passed into the fibre of that component thereby removing the requirement for the fibres to be precisely aligned for light transmission to be successful and reliable.

In the example described above, the cooling device is a dilution refrigerator. When in use, this is located in a cryostat (not shown) that is used to insulate and cool the dilution refrigerator and the environment in which it is located. Cryostats are well known and have a combination of cryogen chambers and/or radiation/vapour shields to provide insulation and cooling to a target region. In this case, at least part of the dilution refrigerator is located within the target region. This is also the region in which the sample holder will be located when mounted to the dilution refrigerator.

In use, the optical communication between the cooling device and the sample is able to be used for a number of applications. Once such application allows for movement of a scanning probe microscope (SPM) tip over atoms of a sample to be monitored. This this achieved by light being transmitted from an external source, through the cooling device to a sample in a sample holder mounted to the cooling device. The light is directed so that it illuminates the SPM tip, which reflects light back along the transmission path to a detector. The reflected light is modulated as the tip moves, and the modulations can be analysed to allow an image of the sample surface to be formed. This application makes use of the cryogenic cooling system according to the example illustrated in FIG. 1.

A further application that the cryogenic cooling system can be used for is a sample, such as a semiconductor, to be illuminated in a particular location. In this manner photons of a certain predetermined energy can be directed at a specific location of a sample. The photons excite the bulk material, and an electrical signal is produced, which can be read out of the sample holder by electronic probes. This can be used to assess the heterostructure of a semiconductor and makes use of the cryogenic cooling system according to the example illustrated in FIG. 1. As an alternative application, electronic signals can be applied to a semiconductor causing it to emit photons. These can then be directed through an optical member of the sample holder, which transmits the photons from a collimator of that optical member to a collimator of an optical member of the cooling device. This then directs the photons towards a fibre, allowing the photons to be transmitted into a fibre in the cooling device and on to an external room temperature location for analysis to determine the properties of said photons.

The invention claimed is:

1. A cryogenic cooling system for providing optical communication with a sample holder, the cryogenic cooling system comprising:
    a cooling device and the sample holder, wherein the sample holder is removably mountable to the cooling device;
    a first optical member comprising a first aperture and a first collimator, light being able to pass through the first aperture, wherein the first collimator is positioned to collimate the light when emitted from the first aperture; and a second optical member comprising a second aperture and a second collimator, the light being able to pass through the second aperture, wherein the second collimator is positioned to collimate the light when emitted from the second aperture, the first optical member being mounted to the cooling device and the second optical member being mounted to the sample holder, wherein when the sample holder is mounted to the cooling device, the first optical member and the second optical member are positioned relative to each other such that the light is able to pass between the first and second apertures via the first collimator and the second collimator, there being a physical gap between the first collimator and the second collimator thereby enabling optical communication between the first optical member and the second optical member.

2. The system according to claim 1, wherein the cooling device and the sample holder, when coupled to each other and in use, are configured to cool a sample in the sample holder to a temperature of about 10 Kelvin (K) or below.

3. The system according to claim 2, wherein the cooling device and the sample holder, when coupled to each other and in use, are further configured to cool the sample in the sample holder to 4K or below.

4. The system according to claim 3, wherein the cooling device and the sample holder, when coupled to each other and in use, are further configured to cool the sample in the sample holder to 50 milliKelvin (mK) or below.

5. The system according to claim 1, wherein the second collimator is configured to focus light towards the second aperture that is received from a distal side of the second collimator with respect to the second aperture.

6. The system according claim 1, wherein the first collimator is configured to focus light towards the first aperture that is received from a distal side of the first collimator with respect to the first aperture.

7. The system according to claim 1, wherein the first collimator and the second collimator are lenses.

8. The system according to claim 7, wherein each lens is an aspheric lens.

9. The system according to claim 1, wherein each of the first aperture and the second aperture is an end of an optical fibre.

10. The system according to claim 9, wherein each optical fibre is connected to the respective optical member by a push-fit connector.

11. The system according to claim 1, wherein the cooling device comprises at least one of a group consisting of a dilution refrigerator, a pre-cooled thermal mass, and a cryogen chamber, any of which the sample holder is able to be thermally coupled in use.

12. The system according to claim 9, wherein each optical fibre is connected to the respective optical member by a screw-fit connector.

* * * * *